United States Patent [19]

Friedrich et al.

[11] 4,325,613

[45] Apr. 20, 1982

[54] ARRANGEMENT FOR MAKING COLOR-PICTURE TUBES

[75] Inventors: Robert Friedrich, Hochdorf; Peter Schmidt, Denkendorf, both of Fed. Rep. of Germany

[73] Assignee: International Standard Electric Corporation, New York, N.Y.

[21] Appl. No.: 195,589

[22] Filed: Oct. 9, 1980

[30] Foreign Application Priority Data

Oct. 13, 1979 [DE] Fed. Rep. of Germany ....... 2941550

[51] Int. Cl.³ .......................... G03B 41/00; H01J 9/00

[52] U.S. Cl. .......................................... 354/1; 29/25.1

[58] Field of Search .................... 354/1; 313/461, 473; 29/25.1, 25.11, 25.12, 25.13, 25.19, 25.2; 430/23, 25; 427/68, 157, 402

[56] References Cited

U.S. PATENT DOCUMENTS 3,319,556 5/1967 Fiore ...................................... 354/1

4,179,200 12/1979 Kotoyori ................................ 354/1

*Primary Examiner*—L. T. Hix

*Assistant Examiner*—William B. Perkey

*Attorney, Agent, or Firm*—John T. O'Halloran; David M. Quinlan

[57] ABSTRACT

Arrangement for making color-picture tubes screens consisting of a faceplate panel and an associated shadow mask by applying phosphor layers to the faceplate using photographic techniques, at which devices for applying, exposing, and developing photosensitive layers are provided. To reduce the handwork without obtaining an assembly-line-like automatic arrangement with interdependent devices, the devices for exposing the screen are united with devices for inserting the shadow mask into, and removing it from, the faceplate to form an automatically operating subarrangement which is independent of the remainder of the arrangement.

5 Claims, 2 Drawing Figures

ARRANGEMENT FOR MAKING COLOR-PICTURE TUBES

The present invention relates to an arrangement for making color-picture-tube screens consisting of a face plate and an associated shadow mask by depositing phosphor layers on the faceplate using photographic techniques, which includes devices for depositing, exposing, and developing photosensitive layers.

Arrangements of this kind are known in which many operations, such as transport between individual devices and repeated insertion of the shadow mask into, and removal from, the faceplace are carried out by hand. Due to the weight of the faceplate, the manual transport is very strenuous, and during the manual insertion and removal of the shadow mask, there is the risk of the deposited phosphor layers being damaged, so that wasters will result during manufacture.

Other arrangements are known in which the entire sequence of operations from the delivery of the uncoated screen to the point where the screen provided with finished phosphor layers is transported away is performed automatically like on an assembly line, so that the difficulties associated with the work done by hand are no doubt eliminated. However, such an arrangement suffers from the disadvantage that any trouble immediately brings the entire arrangement to a standstill. The exposing devices have proved to be particularly susceptible to trouble and to need particularly time-consuming repairs. In addition, the exposure times at the exposing devices can hardly be subordinated to the cycle of an assembly-line-like sequence of operations.

The object of the invention is provide an arrangement which reduces the manual work involved in the production of phosphor layers for screens and does not have the disadvantages of the conventional fully automatic arrangements.

This object is achieved as set forth in claim 1. Preferred embodiments are apparent from the subclaims. Besides facilitating the handwork, the invention has the advantage that the ease of changeability in case of trouble also extends to the devices for inserting and removing the shadow mask.

Another advantage lies in the fact that for the normally three subarrangements according to the invention, only one spare subarrangement needs to be held in reserve, because these subarrangements are relatively easy to adjust to the respective color.

The ease of changeability of the entire arrangement according to the invention proves to be particularly advantageous in case of a change in the screen size to be produced, because it is the devices for inserting and removing the shadow mask which can hardly be retrofitted for different screen sizes.

An embodiment of the invention will now be explained in more detail with reference to the accompanying, highly schematic drawings, in which.

Figure 1:
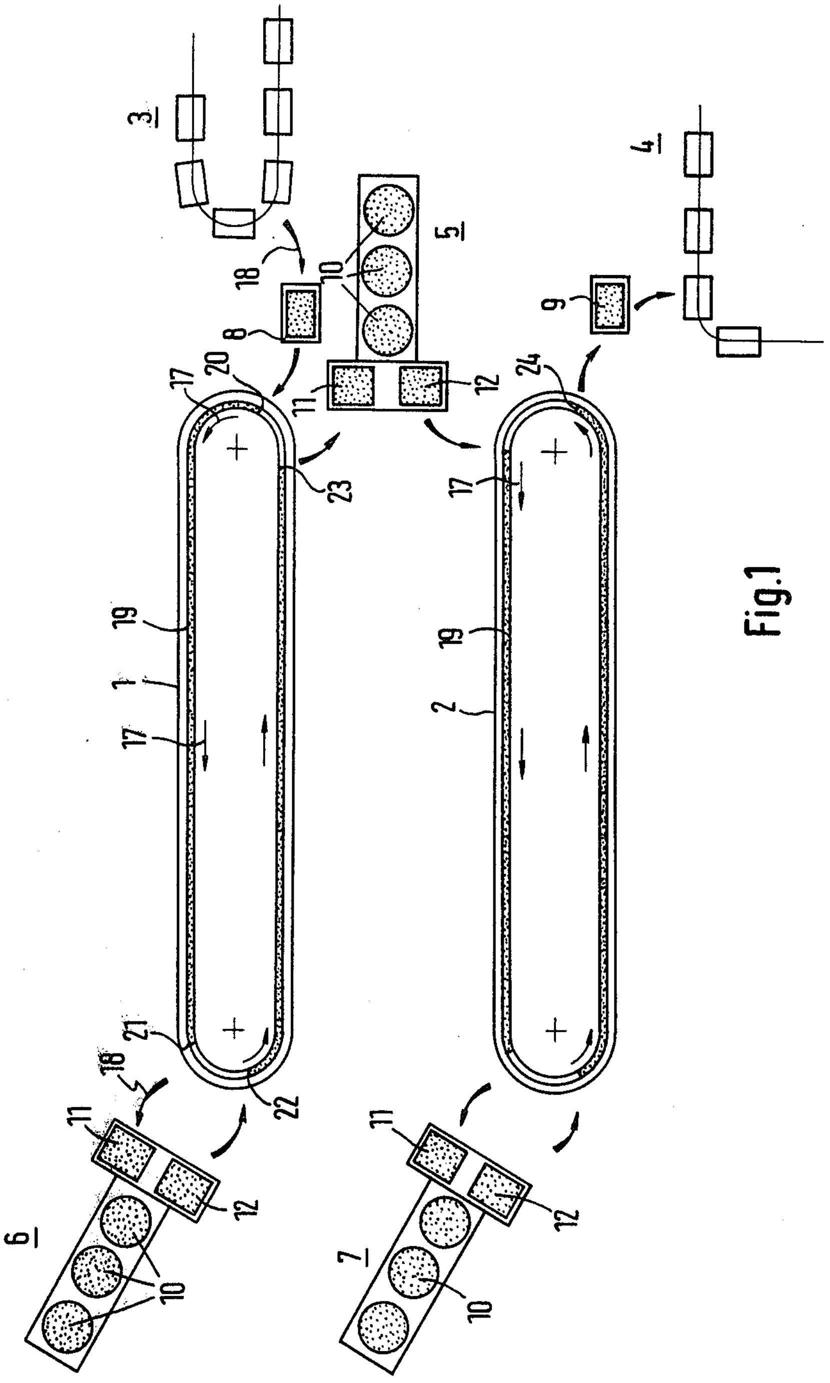
FIG. 1 shows an arrangement according to the invention.

FIG. 1 shows schematically an embodiment of an arrangement for applying phosphor layers to the screen of a color-picture tube from the delivery of the uncoated screen to the point where the finished, coated screen is transported away. The essential parts of the arrangement are the screening devices 1 and 2 for depositing and developing the photosensitive layers, and the subarrangements 5, 6, and 7 for exposing the photosensitive layers, hereinafter referred to as "exposing arrangements".

Figure 2:
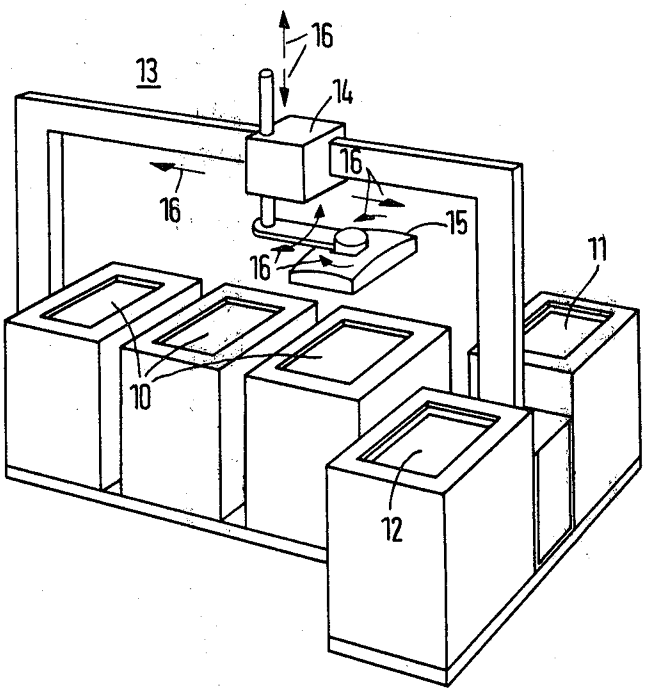
FIG. 2 shows a subarrangement according to the invention for exposing the screen.

FIG. 2 shows an embodiment of the exposing arrangements 5, 6, and 7, whose essential parts are the exposing devices 10, the devices 11 and 12 for inserting and removing the screen, and the transporting device 13.

Further details of FIGS. 1 and 2 will be explained in the following description of the operation of the arrangement. At this point it should be pointed out once again that by the term "screen", a faceplate with associated shadow mask is to be understood here.

As shown in FIG. 1, the uncoated screen is delivered by means of a conveyor 3, and placed on the device 8 for mechanically removing the shadow mask from the faceplate. The faceplate and the shadow mask are then put separately into the screening device 1 at the point 20. The screening devices 1 and 2 have an endless conveyor system which is indicated in FIG. 1 by lines 19 and arrows 17 indicating direction of motion. Advantageously, the shadow mask associated with the faceplate to be treated is carried along on the devices 1 and 2, but it would be possible in principle to store and transport the mask and the faceplace separately.

From points 20 to 21 of the screening device 1, the necessary steps are taken to deposit a photosensitive layer on the faceplate. After being removed from the screening device 1 at the point 21, the faceplace and the associated shadow mask are placed on the inserting device 11 of the exposing arrangement 6, where the two parts are fitted together again.

As shown in FIG. 2, in the exposing arrangement 6, the screen 15 is placed from the inserting device 11 on one of the exposing devices 10, hereinafter referred to as "lighthouses", by means of a portal transporter 13 with a drive 14, whose possible directions of motion are indicated by arrows 16. Following exposure on one of the lighthouses 10, the screen is placed by the portal transporter 13 on the removing device 12, where the faceplate and the shadow mask are separated. The exposing arrangements 5, 6 and 7 may, of course, also be of different design. For instance, the devices 11 and 12 may be replaced by a single device which, with substantially reversible control and the same parts, both separates the faceplate and the associated shadow mask and fits them together. The number of lighthouses 10 may also other than three; this number, among other things, determines the attainable throughput rate of the exposing arrangements 5, 6 and 7.

From the device 12 of the exposing arrangement 6, the faceplate and the associated shadow mask are again placed into the screening device 1 at the point 22, where the necessary steps to develop the photosensitive layer and deposit the next layer are carried out. At the point 23, the faceplate and the associated shadow mask leave the screening device 1 for the last time, and are fed in the same manner as described above to the exposing arrangement 5 and then to the screening device 2, the exposing arrangement 7, and back to the screening device 2 until the production of the three phosphor layers is completed at the point 24 of the screening device 2. The faceplate and the shadow mask are then fitted together on the device 9, and the finished screen can be transported away with a conveyor 4.

The steps carried out on the devices 1 and 2 may, of course, also be performed in a different combination and on a different number of devices; for example, the steps between points 20 and 21 and the steps between 22 and 23 could be carried out on separate devices. The transport paths between the individual devices, indicated in FIG. 1 by curved arrows 18, may also be covered mechanically. The problems encountered during such transport, such as the removal of the screen from the moving conveyor 3 and the placing of the screen on the conveyor belt of the device 1, moving asynchronously with the conveyor 3, can be solved by means familiar to those skilled in the art.

We claim:

1. A self-contained exposing module for use with an arrangement for depositing photosensitive coatings on color picture tube faceplates, developing said coatings after exposure to light through masks, and conveying said faceplates and masks between a plurality of said modules, wherein said module is removable as a unit from said arrangement and comprises:

inserting means for assembling a color picture tube faceplate having a photosensitive coating thereon and a mask, delivered to said module from said arrangement, into a faceplate-mask assembly;

exposing means for exposing said faceplate-mask assembly to light;

removing means for disassembling said exposed faceplate and mask for delivery thereof to said arrangement; and transporting means for transporting said faceplate mask assembly between said exposing means and said inserting and removing means.

2. The self-contained exposing module as recited in claim 1 wherein:

said exposing means comprises a plurality of separate exposing devices;

said transporting means is operable to transport a faceplate-mask assembly to a selected one of said exposing devices from said inserting means and from a selected one of said exposing devices to said removing means;

said inserting means comprises an inserting device; and said removing means comprises a removing device disposed in said module at a location separate from said inserting device.

3. The self-contained exposing module recited in claim 2 wherein said plurality is three.

4. Apparatus for making color picture tubes comprising: an arrangement for depositing photosensitive coatings on color picture tube faceplates, developing said coatings after exposure to light through masks, and conveying said masks and faceplates, the arrangement comprising:

first faceplate conveying means for depositing a first coating on a faceplate, second faceplate conveying means for developing said first coating after exposure to light and for depositing a second photosensitive coating on said faceplate, third faceplate conveying means for developing said second coating after exposure to light and for depositing a third photosensitive coating on said faceplate, fourth faceplate conveying means for developing said third coating after exposure to light, and mask conveying means; and three of the self-contained exposing modules recited in claim 1, wherein:

said inserting means of each module is operable to assemble a faceplate having a coating thereon delivered to said module from one of said faceplate conveying means with a mask delivered to said module from said mask conveying means, said removing means of each module is operable to disassemble an exposed faceplate and mask for delivery of said exposed faceplate from said module to the next faceplate conveying means for developing said exposed coating and depositing the next coating and for delivery of the mask from said module to said mask conveying means, and each of said exposing modules is removable as a unit from said arrangement.

5. The apparatus recited in claim 4 further comprising a fourth said self-contained exposing module for use as a substitute for one of said first three modules in the event of a malfunction thereof.

* * * * *